United States Patent [19]
Bares

[11] Patent Number: 4,808,788
[45] Date of Patent: Feb. 28, 1989

[54] OVEN FOR THE VACUUM BRAZING OF ALUMINUM

[75] Inventor: Jean Bares, Thiais, France

[73] Assignee: Le Traitement Sous Vide, France

[21] Appl. No.: 110,805

[22] Filed: Oct. 21, 1987

[30] Foreign Application Priority Data

Oct. 22, 1986 [FR] France .................. 86 14637

[51] Int. Cl.$^4$ .................................... B23K 1/04
[52] U.S. Cl. .......................... 219/85 E; 219/85 M
[58] Field of Search ............... 219/85 E, 85 R, 85 M

[56] References Cited
U.S. PATENT DOCUMENTS 2,943,181  6/1960  Gunow et al. ............... 219/85 E

FOREIGN PATENT DOCUMENTS 606693  12/1968  U.S.S.R. ............................ 219/85 E
274625   5/1978  U.S.S.R. ............................ 219/85 E

Primary Examiner—Clifford C. Shaw
Attorney, Agent, or Firm—William A. Drucker

[57] ABSTRACT

An oven is provided for the vacuum brazing of a metal such as aluminium or aluminium alloys, including a sealed enclosure having a first heating device for raising the parts to be treated to the brazing temperature, and a pumping device adapted for forming a relative vacuum inside the enclosure, said oven further including a support structure for supporting magnesium elements, as well as a second heating device adapted for raising these elements to a temperature at which the Getter effect begins, the second heating device being independent of the first heating device.

3 Claims, 1 Drawing Sheet

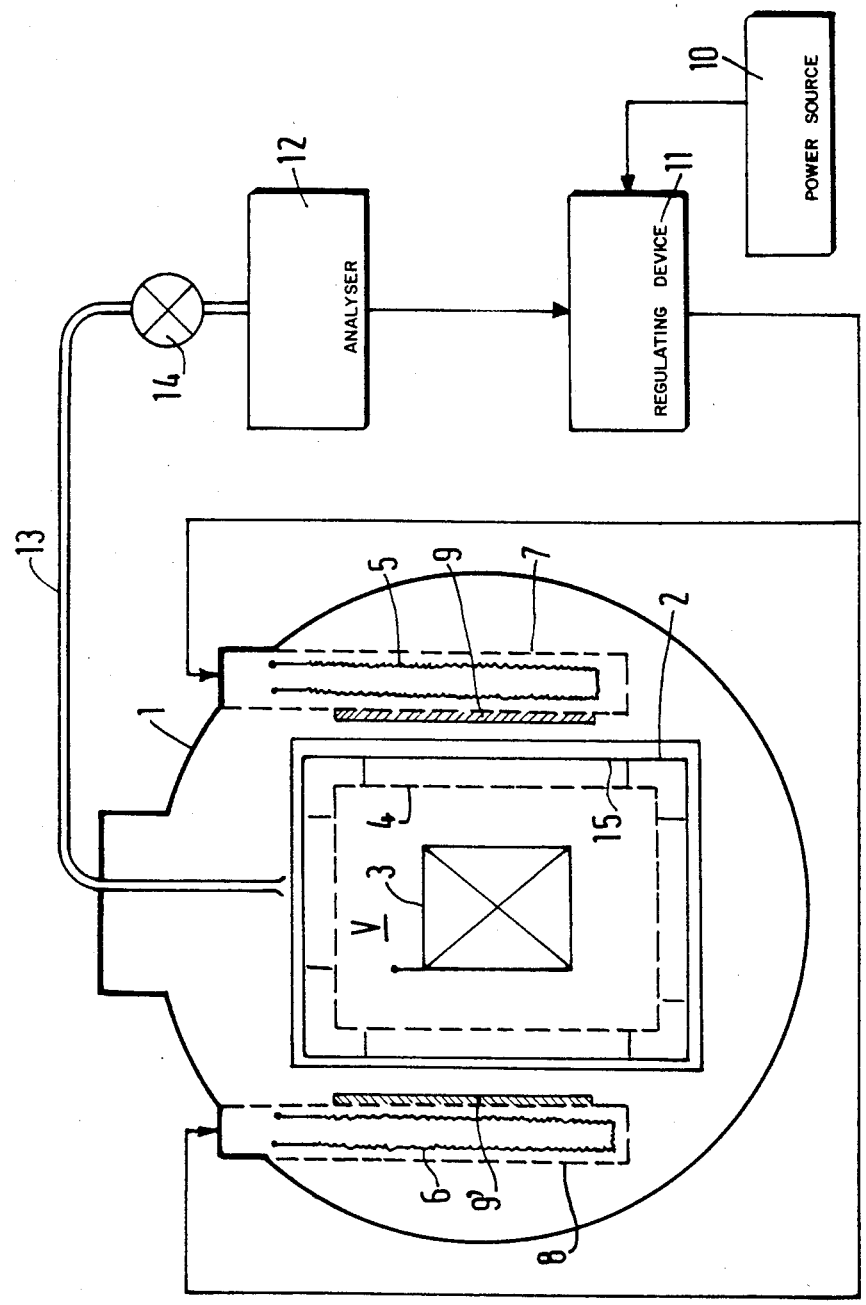

OVEN FOR THE VACUUM BRAZING OF ALUMINUM

BACKGROUND OF THE INVENTION

1. Field of the Invention

The present invention relates to an oven for the vacuum brazing of a metal such as aluminum or aluminum alloys.

2. Description of the Prior Art

It is generally known that in the present state of the technique vacuum brazing of aluminum takes place in the following way:

the parts to be brazed together are disposed inside an oven having a structure similar to that of a conventional oven for the heat treatment in a vacuum of metals, said parts having at least, at the level where the brazing is to be carried out, a plating of a eutectic compound for example having an aluminum and silicon base; at the same time magnesium in the form of chips or wafers is placed in the vicinity of these parts;

then a relative vacuum is provided in the oven at a pressure of about $10^{-4}$ to $5 \times 10^6$ mbar;

then the oven is heated until the brazing temperature (between 500° C. and 600° C.) is obtained.

During this heating, an oxygen absorption effect is first of all obtained by oxidization (combustion) of the magnesium (Getter effect) which starts at a temperature of about 350° C. Such absorption of the oxygen results more particularly in preventing the formation of alumina on the parts to be treated and more particularly at the level where the brazing is to take place. This reaction also causes elimination of the water vapor (reduction of the water).

This technique, although giving good results, nevertheless has drawbacks mainly due:

to an intense formation of magnesium oxide not only at the surface of the magnesium but also throughout the inner volume of the oven (because of the evaporation of the magnesium); the result is pollution of the oven by the magnesium oxide which will further have a tendency to absorb the humidity of the air during the opening phases of the oven, this latter will then have to be frequently cleaned;

to humidity; in fact, the presence of water vapor inside the oven and particular that due to the hygrometry of the magnesium oxide results in a poor operation of the usual vacuum pumps which usually use the diffusion of oil vapor, and it will take longer to reach the treatment pressure, with an increased energy consumption;

to an excessive consumption of magnesium which is a relatively expensive metal.

The invention proposes then overcoming these drawbacks.

SUMMARY OF THE INVENTION

It provides a treatment oven of the above type but further comprising means for supporting the magnesium inside the oven, as well as means for heating this magnesium independent of the heating means used for obtaining the brazing temperature.

Thus, it becomes possible to control the heating of the magnesium and to heat it to a level just necessary for absorbing the amounts of oxygen present inside the oven.

Thus the excessive formation of magnesium oxide is avoided and, in particular, that produced by the magnesium vapor generated at high temperatures is avoided. It is evident that thus an appreciable saving of magnesium is obtained and that the pollution of the oven is considerably reduced.

Furthermore, it becomes possible through prior heating of the magnesium oxide to eliminate the water vapor before and/or during pumping, so that the efficiency of the pumps will be increasing and the time for reaching the treatment pressure will be considerably reduced.

According to another feature of the invention, the oven includes a servocontrol device for controlling the power of the means for heating the magnesium as a function of the composition of the atmosphere reigning inside the oven and, in particular, as a function of its oxygen and water vapor content.

BRIEF DESCRIPTION OF THE DRAWING

One embodiment of the invention will be described, hereafter, by way of non limitative example, with reference to the accompanying drawings in which:

The single FIGURE is a schematical representation of an oven in accordance with the invention.

DESCRIPTION OF THE PREFERRED EMBODIMENT

Such as shown in this FIGURE, this oven includes a sealed enclosure 1 of a substantially cylindrical shape, access to the inside of which may be obtained through a sealed door not shown.

This enclosure 1 is connected in a way known per se to pumping means (not shown) capable of forming a relative vacuum, of the order of $10^{-4}$ to $5 \times 10^{-6}$ mbar.

Heating of the parts to be treated inside the oven is achieved by radiation using a heating device including:

a thermal enclosure 2 of a a substantially parallelepipedic shape whose walls forms heat screens and which defines a central volume v inside which the parts to be treated are disposed, this thermal enclosure being optically closed but not sealed with respect to the gas contained in the oven; and the electric heating resistances 4 disposed parallel to said walls, inside the thermal enclosure 2.

These resistances 4 are connected to an electric power source external to the oven (not shown), the whole being able to heat the parts to be brazed to a temperature of the order of 650°.

The oven further includes, inside enclosure 1 but outside the thermal enclosure 2, auxiliary heating means provided for heating magnesium, for example in the form of wafers or chips, independently of the heating of the parts to be treated by the heating resistances 4.

In the example shown, these auxiliary heating means are composed of two heating resistance networks 5, 6 which extend parallel to the vertical walls of the thermal enclosure 2.

These resistances 5, 6 are protected by latticed walls 7, 8 on which the magnesium wafers 9, 9' are fixed. The power supply for the heating resistances 5, 6 is then provided by a supply circuit delivering a current whose power is controlled as a function of the nature of the gaseous composition present inside the oven and in particular of its oxygen and water vapor content.

For this, this power supply circuit includes a power source 10 and a regulating device 11 which controls the power applied to resistances 5, 6 as a function of the results of the analysis of the gaseous composition present inside the oven and provided by an analyser 12. This latter receives a sample of the gas present inside the oven through a sampling circuit 13 equipped with a pump 14.

It is clear that, with this device, it becomes possible to heat the magnesium (plates 9, 9') independently of the heating of the parts to be brazed 3 and, consequently, to cause the Getter effect at the desired time, as required before and/or during pumping.

Furthermore, through regulation of this heating as a function of the oxygen the water vapor content of the atmosphere inside the oven, the production of magnesium oxide and therefore the consumption of magnesium may be reduced to what is strictly necessary.

Of course, if it should be necessary, it is possible to dispose magnesium close to the parts 3 so as to complete removal of oxygen and water vapor from the oven.

In the example shown, the thermal enclosure 2 which also serves as support for the resistances 4 is doubled, on the outer side, by a lighter and readily removable enclosure 15. This second enclosure, which has been shown with fine lines, serves as a thermal screen for enclosure 2 and as a magnesium trap. Once the treatment is finished, it may be readily removed then cleaned.

What is claimed is:

1. An oven for vacuum brazing of pieces made of a metal such as aluminum or aluminum alloys, the said oven comprising:

i—a sealed enclosure provided with a sealed door and enclosing a composition of gases;

ii—a thermal enclosure defining a central volume v inside which the said pieces can be disposed, the said thermal enclosure being located inside the sealed enclosure and delimiting therewith an intercalate volume;

iii—first heating means disposed inside the said central volume v so as to heat the said pieces to a brazing temperature;

iv—means for pumping gases contained inside the sealed enclosure;

v—means for supporting magnesium elements in the said intercalated volume;

vi—second heating means independent from said first heating means, which are located in the said intercalated volume, so as to raise the magnesium elements to a temperature at which a Getter effect begins, wherein said thermal enclosure is pervious to said gases and forms a thermal insulating screen between the central volume and the intercalated volume.

2. The oven as claimed in claim 1, wherein the said second heating means has a power which is controlled by a servocontrol device, as a function of the composition of gases.

3. The oven as claimed in claim 1, wherein the thermal enclosure comprises an outer side which is doubled by a removable enclosure.

* * * * *